Figure 8:
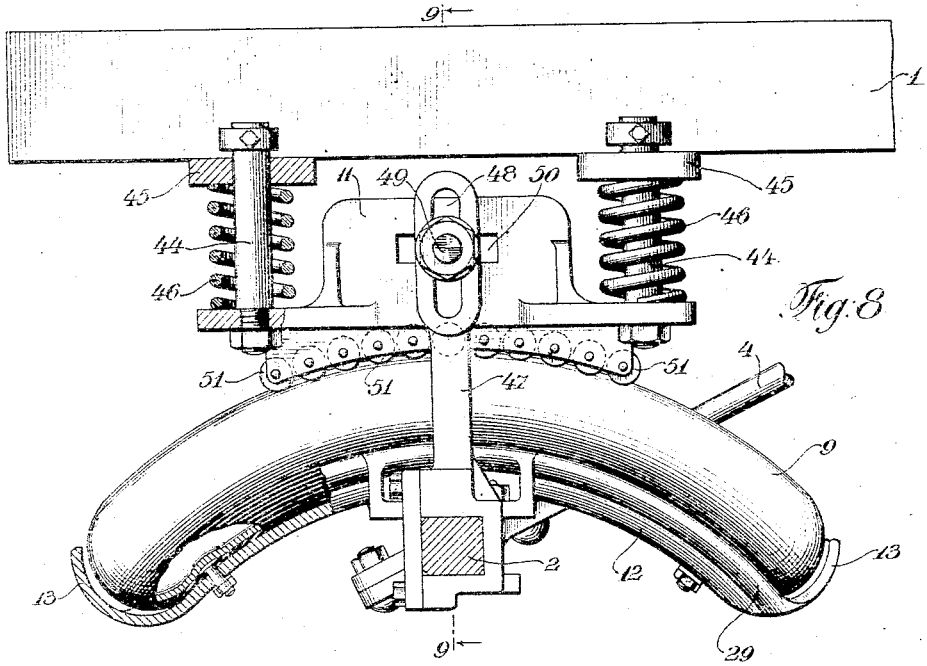

T. A. KLENKE.
VEHICLE.
APPLICATION FILED AUG. 28, 1907.
1,107,311.
Patented Aug. 18, 1914.
6 SHEETS—SHEET 1.
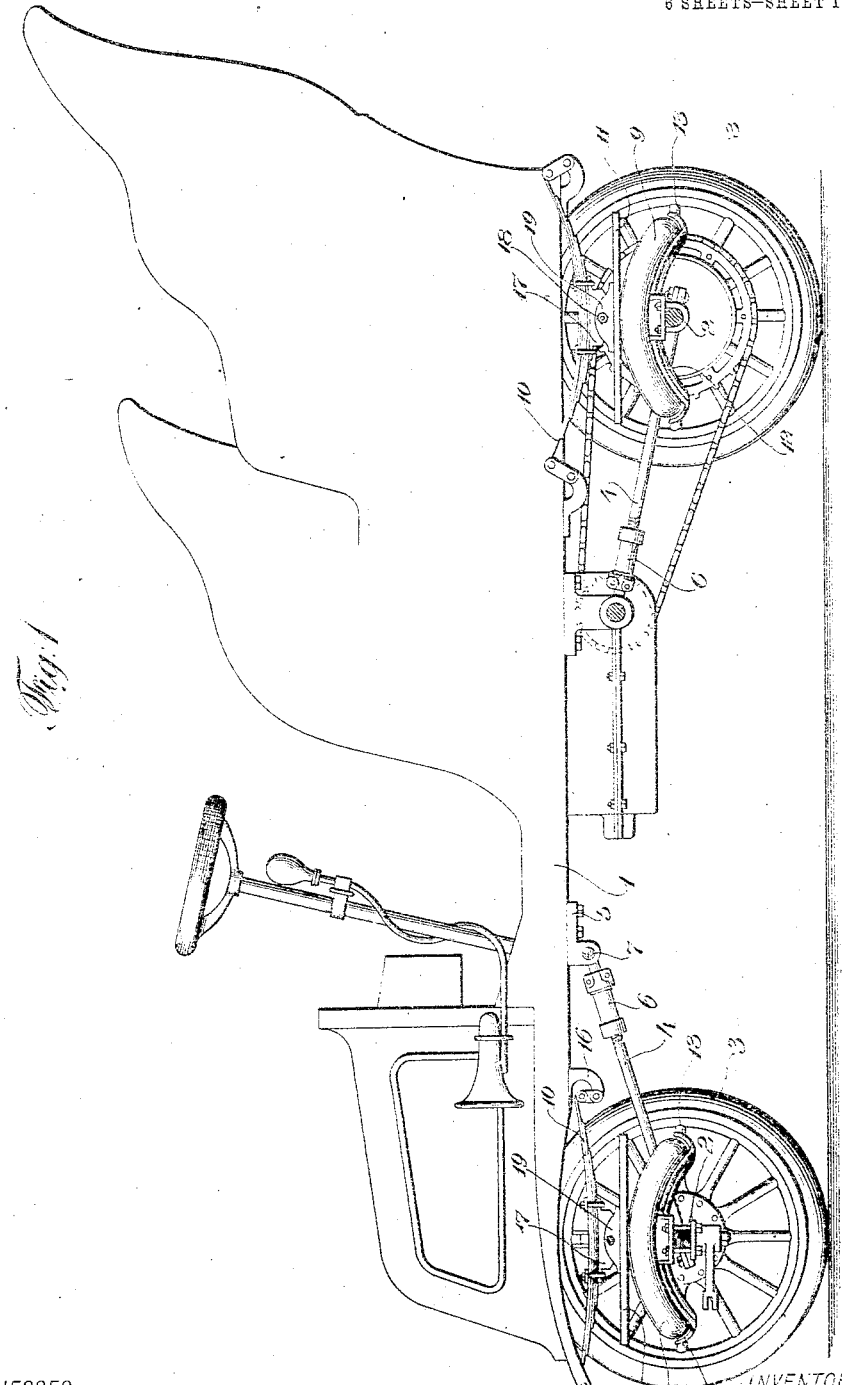
WITNESSES
INVENTOR
Theodore A. Klenke
BY
Kenyon & Kenyon
ATTORNEYS T. A. KLENKE.
VEHICLE.
APPLICATION FILED AUG. 28, 1907.
1,107,311.
Patented Aug. 18, 1914.
6 SHEETS—SHEET 2.
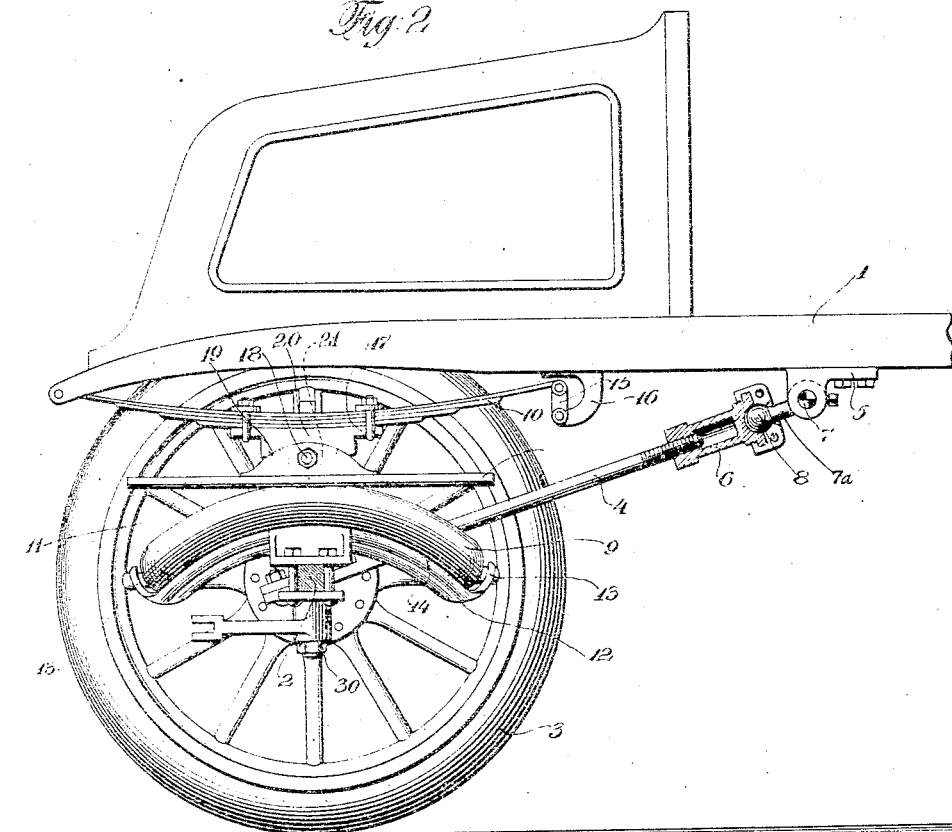
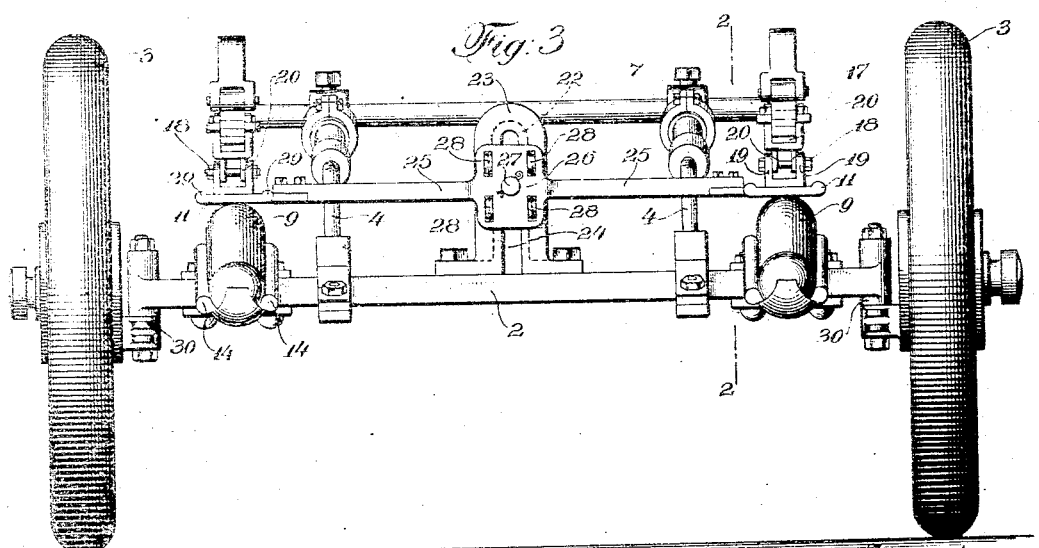

T. A. KLENKE.
VEHICLE.
APPLICATION FILED AUG. 28, 1907.
1,107,311.
Patented Aug. 18, 1914.
6 SHEETS—SHEET 3.
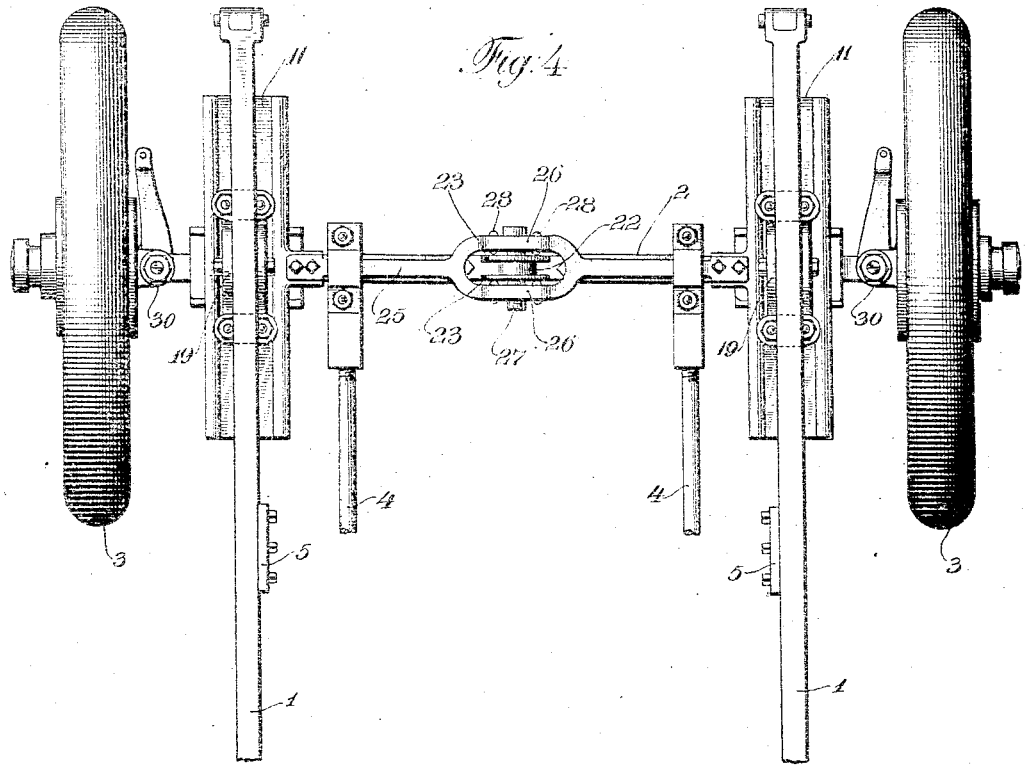
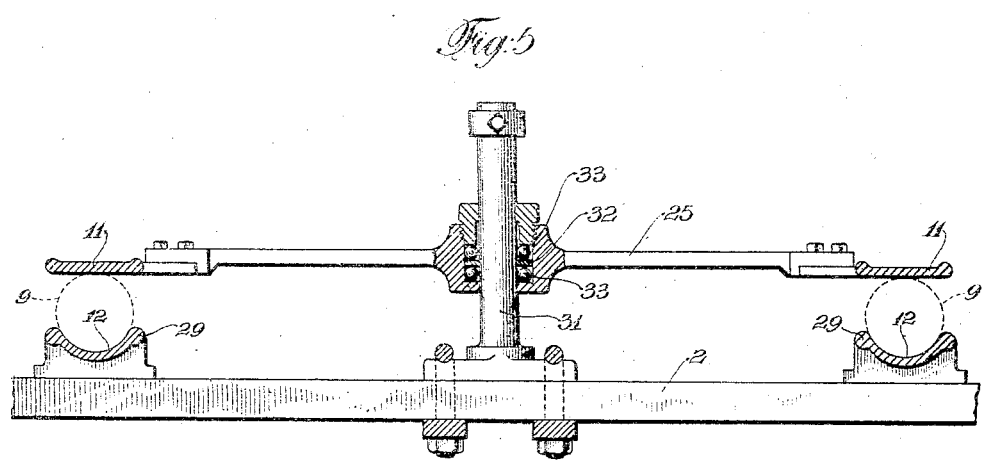

T. A. KLENKE.
VEHICLE.
APPLICATION FILED AUG. 29, 1907.
1,107,311.
Patented Aug. 18, 1914.
6 SHEETS—SHEET 4.
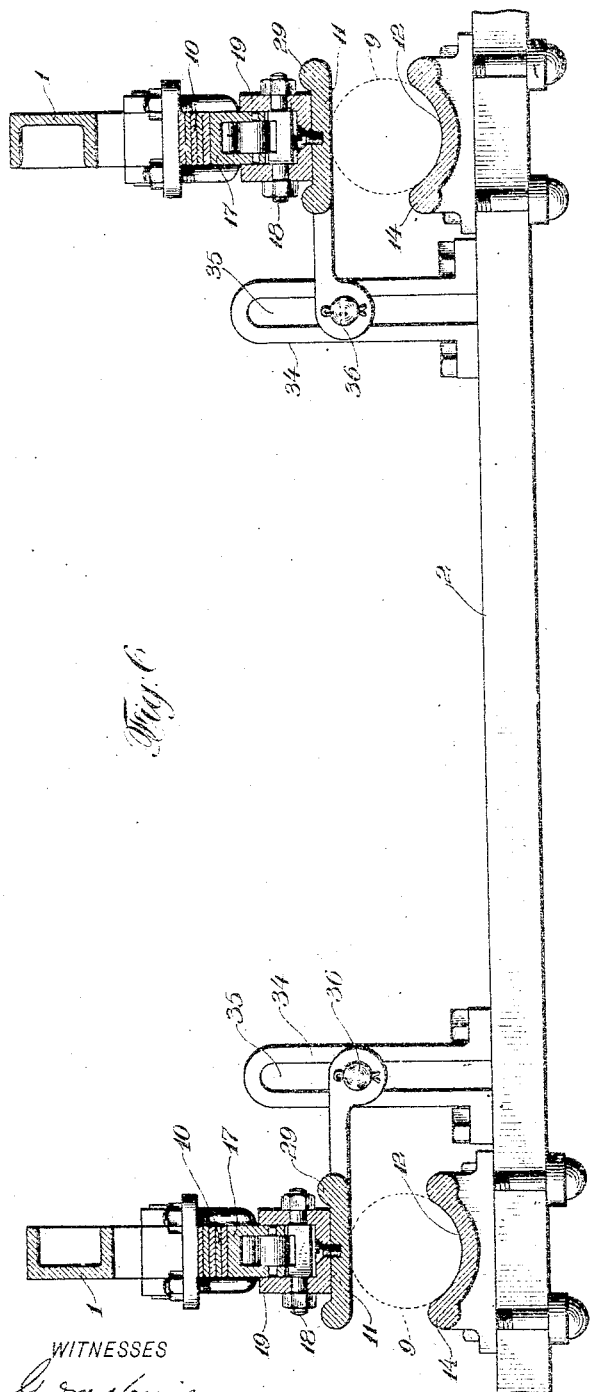
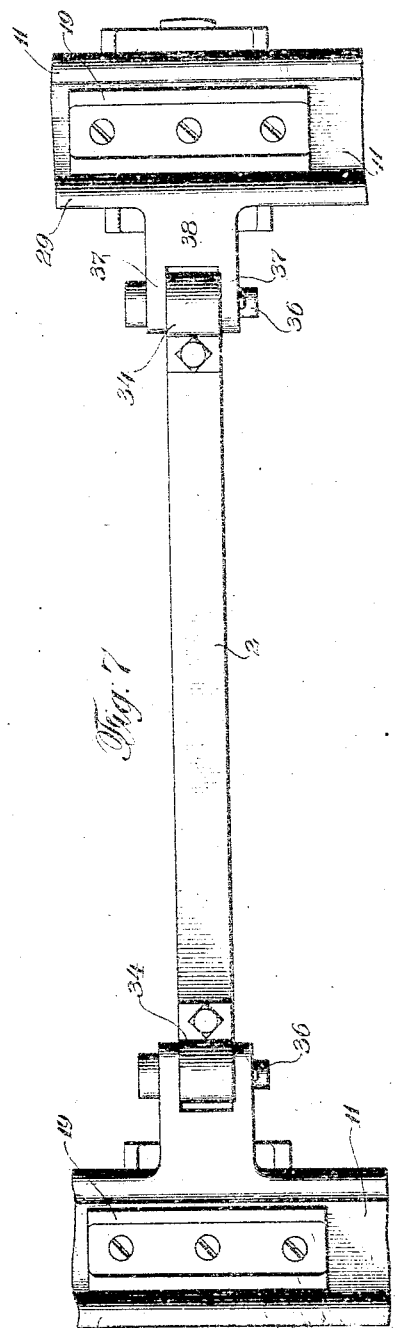
WITNESSES
INVENTOR
Theodore A. Klenke
BY
Kenyon & Kenyon
his ATTORNEYS

T. A. KLENKE.
VEHICLE.
APPLICATION FILED AUG. 28, 1907.

1,107,311.

Patented Aug. 18, 1914.

6 SHEETS—SHEET 5.

Witnesses:

Inventor
Theodore A. Klenke
By his Attorneys
Kenyon & Kenyon

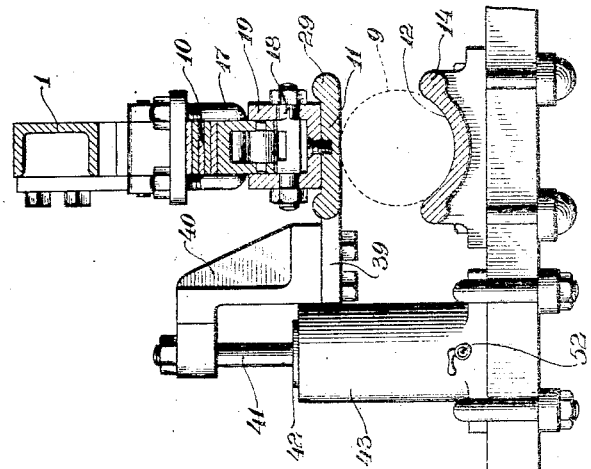
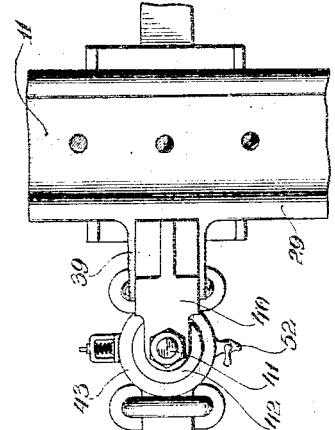
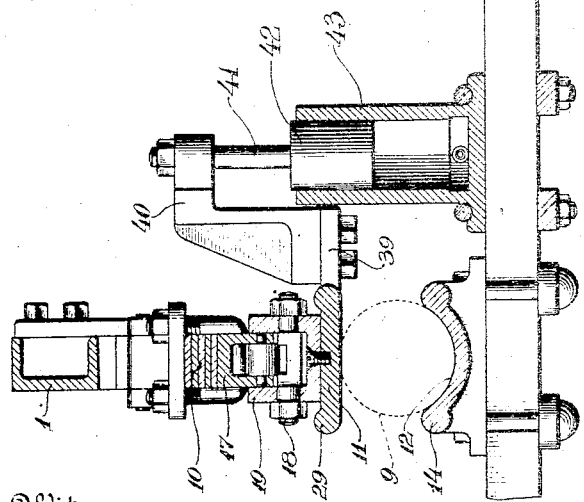
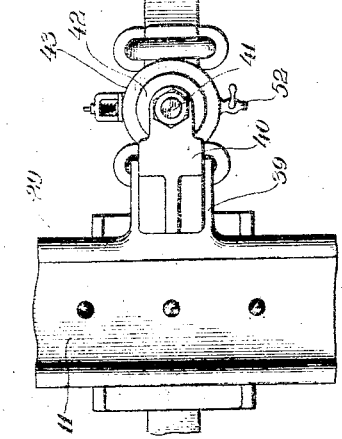

UNITED STATES PATENT OFFICE.

THEODORE A. KLENKE, OF NEW YORK, N. Y., ASSIGNOR, BY DIRECT AND MESNE ASSIGNMENTS, TO KLENKE CUSHION AXLE COMPANY, A CORPORATION OF NEW YORK.

VEHICLE.

1,107,311.   Specification of Letters Patent.   Patented Aug. 18, 1914.

Application filed August 28, 1907. Serial No. 390,451.

*To all whom it may concern:*

Be it known that I, THEODORE A. KLENKE, a citizen of the United States, and a resident of the city, county, and State of New York, have invented certain new and useful Improvements in Vehicles, of which the following is a specification.

My improvement relates to vehicles and especially to the connections between the axle and bed of vehicles and to cushioning devices used between the axle and the bed.

It has for its object to improve and simplify such connections, to make them more flexible and elastic, to more effectually prevent shocks and jars from being communicated from the axle to the bed, and to provide a new and improved pneumatic cushioning means adapted to be employed in vehicles and especially in my improved connections between the axle and the bed.

It consists of the novel devices and combinations herein shown and described.

In the drawings accompanying this specification and forming part hereof I have shown my improvement in its preferred form and have shown it as embodied in connection with an automobile, although its use is not limited to such a vehicle.

Figure 9:
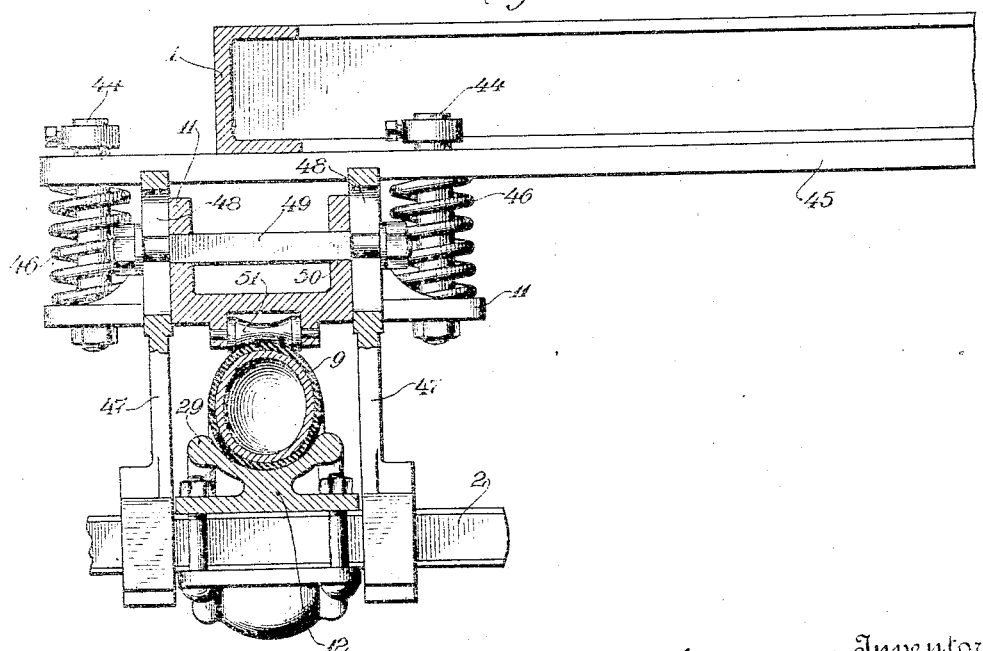

Referring now to the specific embodiment or form of my invention shown in the accompanying drawings, Figure 1 represents a side view of an automobile with my improvement embodied in connection with it, the nearer front and rear wheels being omitted for the sake of clearness. Fig. 2 is a vertical section through the axle showing an elevation of the right front wheel of the automobile and its connections; Fig. 3 is a front view of the front axle and connecting parts; Fig. 4 is a plan view of the front axle and connecting parts; Fig. 5 is a vertical section taken immediately in front of the front axle and through certain of its connecting parts, the axle and its connecting parts here shown being a modification of that shown in Fig. 4; Fig. 6 is a front view of a modified form of axle and connections; and Fig. 7 a plan view of the same with certain of the upper parts of Fig. 6 omitted for the sake of clearness; Fig. 8 is a sectional side view of a modified form of cushioning device, and Fig. 9 is a section on the lines 9 9 of Fig. 8. Fig. 10 is a vertical section through another modified form of axle and connections and Fig. 11 is a plan view of the same with certain of the upper parts or Fig. 10 omitted for the sake of clearness.

I will now describe the specific form of apparatus shown in Figs. 1, 2, 3 and 4. In these figures 1 represents the bed or body of an automobile of any usual construction, 2 the axles and 3, 3, the wheels. Any suitable form of wheels may be used. Those shown are provided with solid rubber tires, it being an advantage of my improved device that pneumatic tires may be dispensed with in automobiles and other heavy vehicles.

In my improved connection between the axle and the bed of the vehicle I employ devices which make the connection between the two flexible and elastic and which permit the axle certain motions when riding over obstructions or through depressions without communicating them, or communicating them in part only, to the bed. Thus the axle is free to rotate slightly or rock on its axis without transmitting this motion to the bed, and it is free to swing vertically and longitudinally with reference to the bed, these motions being reduced in amount when transmitted through my improved connections and cushioning device, so as to make the car easy running at all times. Rigidly secured to each axle 2 are two radius rods 4, 4. These radius rods are pivoted to studs 7ª fast to rod 7, fast in brackets 5 at each end of the body. 6 represents any suitable means for adjusting the length of the radius rods. A universal joint 8 permits some play to these radius rods. These radius rods permit the axle to swing on the center 8, and thus move vertically and longitudinally with reference to the body, but at the same time in these movements they rock or rotate the axle slightly on its axis.

Between the axle and the car body I employ suitable resilient means or cushioning devices. In the form shown I have provided for each end of the axle a pneumatic cushion 9 and also a leaf spring 10. Either one or both of these or any other suitable cushioning device may be employed for this purpose. The cushioning devices are used with connections between the axle and the car body which permit vertical movement between the two, so that the weight of the body will rest upon the cushioning device and so that the axle will be free to move longitudinally and to rock on its axis. The particular means shown for this purpose consist of an upper plate 11, shown preferably as all flat, and a lower plate 12 for supporting between them the pneumatic cushion 9. Plate 12 is preferably made curved in whole or in part; as shown it is curved throughout its entire length and has turned up or cup shaped or curved ends 13, 13, and the edges of the plate are preferably turned down as shown at 14, to avoid cutting the pneumatic cushion. Upon this curved plate 12 I place the pneumatic cushion, 9, and this is preferably made of a curved form to correspond substantially to the curved shape of the plate 12 and, as shown, is made slightly shorter than the plate, so that when resting and not under compression the rounded ends of the pneumatic cushion 9 will be separated from the cup shaped ends 13 of the plate. The weight of the vehicle bed and body rest upon the upper part of the pneumatic cushion 9 through plate 11.

When greater than the normal weight is brought upon the cushion through shock or jar, the cushion is somewhat elongated and is brought to bear against the cup-shaped ends of plate 12. For this reason and also because of the curved shape of the cushion and its supporting plate, and also because of the flat shape of the upper plate 11, a greater bearing of compression surface of the pneumatic cushion is employed during heavy shocks or jolts than at other times and the cushioning or resilient power of the cushion is increased.

The leaf spring 10 is secured at its forward end to the car body, as shown in Fig. 2, and its rear end to a link 15, which is pivoted to a bracket 16 dependent from the bed. At its middle lower portion is bolted to it a supporting piece 17, to which is secured plate 11. Plate 11 is pivoted by means of a bolt 18, passing through two upwardly projecting lugs 19 on plate 11 and through two dependent lugs 20, 20 from supporting piece 17. A longitudinal slot 21 in lugs 20, 20, shown in dotted lines in Fig. 2, is provided so as to permit bolt or pivot 18 and plate 11 to move longitudinally a slight distance relative to the bed of the vehicle. This connection permits each plate 11 to swing and to move longitudinally relative to the bed. The lower plate 12, which is carried rigidly by the axle, of course moves with the axle, swinging as the axle rocks on its axis and moving vertically and longitudinally with the axle. The above connection between the upper plate 11 and supporting piece 17, enables the upper plate to follow exactly the motions of the lower plate 12 and thus always maintain the two plates in the same relative position with reference to each other, and facing each other always in the same way. The means for making each upper plate 11 thus follow the motions of the axle and the lower plate, consist, as shown in Figs. 1 to 4, of an arch-shaped piece 22 provided with two flanges 23, 23, one on each side, rigidly bolted to axle 2. This arch-shaped piece 22 has a vertical slot 24. 25 is a cross-piece rigidly connecting upper plate 11 on one side of the vehicle, with upper plate 11 on the other side. Crosspiece 25 divides at or near its center into two vertical plates 26, 26, separated from each other. Between them lies the arch-shaped piece 22, see Fig. 4. A pin 27 passes from one plate 26 to another, and is rigidly secured to both. This pin passes through slot 24, and moves up and down as that slot as crosspiece 25 moves vertically. I preferably provide rollers 28 rotatably carried in openings in plates 26, the rollers bearing on flanges 23, 23 in order to reduce friction.

By means of the above devices upper plates 11 rest upon cushions 9 and are free to move vertically with reference to the axle, but all the other movements of the axle are communicated to these plates, to wit: the rocking on its axis and the longitudinal movements of the axle. These connections also prevent lateral displacements between the bed and the axle. The pin 27 in slot 24 also permits a slight rocking or rotation to crosspiece 25 around pin 27 as a center, thus permitting the two connected upper plates 11 a slight variation in their vertical play with reference to each other. The plate 11 has preferably a turned over edge 29, 29 in order to prevent the cutting of the pneumatic cushion. The turning over in this case is of course upward, whereas the turning over in the lower plate 12 was downward, in both cases away from the pneumatic cushion. Each wheel 3 is connected with the axle by means of the ordinary swivel joint represented at 30, Fig. 2. The back axle is provided with the same connections between it and the bed, and the same cushioning devices. These will not be specially described as they correspond in all substantial respects with those described for the front wheel. The only difference is that the radius rods 4 for the hind wheels have their pivot point connected with the bed in front of the rear axle, whereas the front axle, as shown, has its pivot point to the rear of the axle. I prefer the placing of the pivot point in front of the axle, but have placed it behind in the case of the front axle simply because there was not sufficient room in the automobile shown in the drawings to give it a proper slant.

Fig. 5 represents a modification in the connections between the axle 2 and the upper plates 11. In this case a round support or pillar 31, carries the crosspiece 25 instead of the arch-shaped piece 22. Crosspiece 25 has at its center an enlargement containing a circular opening surrounding the pillar 31. Preferably this opening is made a little larger at its upper end than the pillar 31, providing a recess 32 in which are placed bearing balls 33. This arrangement accomplishes the same result substantially as that shown in Fig. 3 except that in this case there is no vertical rocking of the plates 11, 11 about the center support as there is in the form shown in Fig. 3 already described.

Figs. 6, 7, 10 and 11 contain modifications of the connections between the axle and the upper plates 11. In the two forms of devices shown in these four figures each upper plate 11 is independent of the upper plate 11 on the opposite side of the vehicle. Each plate 11, however, while free to move vertically with reference to the axle, is caused to move with the axle in all other directions.

In the form shown in Figs. 6 and 7 there is provided toward each end of the axle an arch-shaped piece 34 having a central vertical slot 35. In this slot a pin 36 is free to move. The pin passes through two lugs 37, 37 of an extension 38 of plate 11. This arrangement permits vertical movement of the plate 11 with reference to the axle, but communicates any rocking or rotation of the axle on its axis as well as any longitudinal movement of the axle to the upper plate. The upper plate 11 is connected to the supporting piece 17 and the bed in exactly the same way as described with reference to Figs. 1 to 4 inclusive.

The form shown in Figs. 10 and 11 has an individual and independent connection between each upper plate 11 and the axle, but the form of this connection is somewhat different from that of Figs. 6 and 7. In Figs. 10 and 11 each upper plate 11 has an extension 39, to which is bolted a vertical bracket 40. This bracket carries depending from an outwardly extending portion a piston rod 41 carrying a piston 42 at its lower end. The piston rod is bolted to the bracket 40. The piston 42 works vertically up and down in a vertical cylinder 43 bolted to the axle 2. The arrangement of these parts not only causes upper plate 11 to move in every direction except vertically with the axle, but also provides an additional cushioning device in the shape of a dashpot to reduce the effect of vertical movement between the axle and the bed. Each upper plate 11 is connected with supporting piece 17 and the bed, in an exactly similar manner to the device of Figs. 1 to 4.

In Figs. 8 and 9 is shown a modification of the connections between the axle and the bed in which the upper plate 11 does not move with the axle, but so far as the rocking and longitudinal movements of the axle are concerned it is immovable relatively to the axle. As there shown, the plate 11 has rigidly secured to it two bolts 44, 44, which pass upward and loosely through crosspieces 45 secured to the bed 1. 46, 46 are spiral springs encircling bolts 44 and lying between the extensions of plate 11 and the crosspieces 45. These serve to press plate 11 downward away from the bed. The axle is provided with two vertical arms 47, 47 rigid with the axle and extending vertically upward. Each arm 47 has a vertical slot 48 near its upper part. Through the slots pass a bolt 49. This bolt passes loosely through a horizontal slot 50 in plate 11. The slotted portion of arm 47 is free to play vertically around bolt 49, and bolt 49 is free to move horizontally and longitudinally in slot 50 of plate 11. Bolt 49 accordingly acts as a pivot point for the axle 2 and the arms 47 relative to plate 11, and this pivot point is movable longitudinally. The arrangement permits the axle to swing on its axis and to move vertically and longitudinally without communicating these movements to plate 11 or the bed, except as the vertical movement of the axle is transmitted in a reduced or modified way through the pneumatic cushion.

In order to reduce the friction and the wear and tear on the upper surfaces of pneumatic cushion 9 due to its rocking movement relative to the plate 11, I preferably provide a series of rollers 51 loosely pivoted in the lower side of projections from plate 11.

It will be understood of course that many changes, modifications and departures from the specific devices shown in the drawings, can be made without departing from my invention.

In Figs. 10 and 11, 52 is a pet cock on cylinder 43, for the purpose of regulating, as desired, the discharge and admission of air to the cylinder.

What I claim as new and desire to secure by Letters Patent, is:

1. In a vehicle the combination of an axle, a bed, a pneumatic cushion interposed between the axle and the bed and supports for the pneumatic cushion, one connected with the bed and the other with the axle, one of said supports having a convexly curved portion, and the pneumatic cushion having a curved portion conforming to the convexly curved part of such support, and the other of such supports being a flat plate adapted to bear against the convexly curved part of the cushion.

2. In a vehicle the combination of an axle, a bed, an upwardly curved supporting plate connected with the axle, a flat plate connected with the bed, and a pneumatic cushion supported between said plates and being curved to conform to the upwardly curved lower supporting-plate.

3. In a vehicle the combination of an axle, a bed, two supports for a pneumatic cushion, one support connected with the bed and the other with the axle, and one of said supports being curved throughout its length and being provided with rolled over or cup-shaped ends, and a pneumatic cushion interposed between the said supports curved throughout its length to conform to the curve of the curved support, and rounded at its ends to conform to the rolled-over or cup-shaped ends of the support.

4. In a vehicle the combination of an axle, a bed, two supports for a pneumatic cushion, one support connected with the bed and the other with the axle, and one of said supports being curved throughout its length and being provided with rolled over or cup-shaped ends, and a pneumatic cushion interposed between the said supports curved throughout its length to conform to the curve of the curved support, and rounded at its ends to conform to the rolled-over or cup-shaped ends of the support, and being shorter than the support, whereby when unusual pressure is brought by the supports upon the pneumatic cushion the latter will lengthen and the rounded ends will make contact with the cup-shaped ends of the curved support, but at other times the rounded ends will not make such contact.

5. In a vehicle the combination of an axle, a bed, two supports for a pneumatic cushion, one support connected with the bed and the other with the axle, and one of said supports being curved throughout its length and being provided with rolled over or cup-shaped ends, and a pneumatic cushion interposed between the said supports curved throughout its length to conform to the curve of the curved support, and rounded at its ends to conform to the rolled-over or cup-shaped ends of the support, and being shorter than the support, whereby when unusual pressure is brought by the supports upon the pneumatic cushion the latter will lengthen and the rounded ends will make contact with the cup-shaped ends of the curved support, but at other times the rounded ends will not make such contact, and the other of said supports consisting of a flat plate.

6. In a vehicle the combination of an axle, a bed, two supports interposed between the bed and the axle, one connected to the axle and the other to the bed, the support connected to the axle being curved throughout its length and being provided at its ends with rolled over or cup-shaped ends, and the other support connected to the bed consisting of a flat plate, and a pneumatic cushion carried between the two supports and curved throughout its length to conform to the curve of the support connected to the axle and having rounded ends conforming to the shape of the rolled over ends or cup-shaped ends of the same, and the said pneumatic cushion being slightly shorter than the supports connected with the axle, whereby when unusual pressure is brought by the supports upon the pneumatic cushion the latter will lengthen and the rounded ends will make contact with the cup-shaped ends of the curved support, but at other times the rounded ends will not make such contact.

7. In a vehicle the combination of an axle, a bed, and a support for a pneumatic cushion, said support being connected to the axle and having the form of an upwardly curved plate provided with rolled over edges to prevent cracking or breaking of the pneumatic cushion, and a pneumatic cushion supported by said support and of nearly the same length as the support and curved to correspond to the upward curve of the support.

8. A pneumatic cushion for use between the axle and bed of a vehicle curved on both its sides and throughout its length and provided with rounded ends.

9. A support for a pneumatic cushion adapted for use between the axle and bed of a vehicle, said support being curved throughout its length, and having rolled over or cup-shaped ends.

10. In a vehicle the combination of an axle, a bed, a resilient means interposed between the axle and the bed, two supports for the resilient means, one connected with the axle and the other connected with the bed, a connection between the axle and the upper support adapted to move that support longitudinally with the axle and to rock it with the rocking axial movement of the axle, and connections between the upper support and the bed permitting that support to rock and to move longitudinally relatively to the bed.

11. In a vehicle the combination of an axle, a bed, a resilient means interposed between the axle and the bed, two supports for the resilient means, one connected with the axle and the other connected with the bed, a connection between the axle and the upper support adapted to move that support longitudinally with the axle and to rock it with the rocking axial movement of the axle, but permitting vertical play between the upper support and the axle, and connections between the upper support and the bed permitting that support to rock and to move longitudinally relatively to the bed.

12. In a vehicle the combination of an axle, a bed, a pneumatic cushion interposed between the axle and the bed, two supports for the pneumatic cushion, one connected with the axle and the other connected with the bed, a connection between the axle and the upper support adapted to move that support longitudinally with the axle and to rock it with the rocking axial movement of the axle, but permitting vertical play between the upper support and the axle, and connections between the upper support and the bed permitting that support to rock and to move longitudinally relatively to the bed.

13. In a vehicle the combination of an axle, a bed, two pneumatic cushions, one toward each end of the axle, two supports for each pneumatic cushion, a lower one connected with the axle and an upper one connected with the bed, a bar rigidly connecting the two upper supports, connections between the axle and such connecting bar adapted to permit the upper supports to have vertical play relative to the axis but causing them to move longitudinally with the axle and to rock with the rocking axial movement of the axle, and a connection between each upper plate and the bed permitting such upper plate to rock and move longitudinally relatively to the bed.

14. The combination in a vehicle of an axle, a bed, two pneumatic cushions one near each end of the axle, two supports for each pneumatic cushion, the lower one connected with the axle and the upper one connected with the bed, a rigid bar connecting the two upper supports, connections between the axle and such rigid bar permitting the bar and the upper supports to have vertical play relative to the axle, and to have a slight vertical motion relative to each other rocking on the center of the connecting bar as a pivot but causing both upper plates to move longitudinally with the axis and to rock with the axial rocking of the axle, connections between each upper plate and the bed permitting such upper plate to rock and to move longitudinally relatively to the bed.

15. In a vehicle the combination of an axle, a bed, two pneumatic cushions for each axle, two supports for each pneumatic cushion, the lower one connected to the axle and the upper one connected to the bed, a rigid connecting bar between the two upper supports, a vertical piece connected with the axle, a pin and slot arrangement between the vertical piece and the connecting bar permitting vertical movement of one to the other, the upright piece and the rigid connecting piece having contacting surfaces so shaped as to be adapted to make the upper supports rock and move longitudinally with the axle, rollers interposed between the vertical piece and connecting bar secured to one and rolling upon the other, and connections between each upper plate and the bed adapted to permit the upper plate to rock and move longitudinally relatively to the bed.

16. In a vehicle the combination of an axle, a bed, a spring secured to the bed, a pneumatic cushion, two supports therefor, one carried by the axle and the other support movably secured to the spring, and connections between the upper support and the spring, permitting the upper support to rock and move longitudinally relatively to the spring and bed.

17. In a vehicle the combination of an axle, a bed, a spring secured to the bed, a pneumatic cushion, two supports therefor, the lower one carried by the axle, the upper one movably secured to the spring so as to be free to rock and move longitudinally thereon, and connections between the axle and the upper supporting plate permitting vertical play between the plate and the axle, but causing the upper plate to move longitudinally and to rock with the axle.

18. In a vehicle the combination of an axle, a bed, two pneumatic cushions, a lower support for each pneumatic cushion carried by the axle, an upper support for each cushion connected to the bed, connections between the axle and each upper support permitting it, independently of the other upper support of the other cushion, to move vertically in reference to the axle, but causing it to move longitudinally and to rock with the axle.

19. In a vehicle the combination of an axle, a bed, two pneumatic cushions, a lower support for each pneumatic cushion carried by the axle, an upper support for each cushion connected to the bed, connections between the axle and each upper support permitting it, independently of the other upper support of the other cushion, to move vertically in reference to the axle, but causing it to move longitudinally and to rock with the axle, and connections between each upper plate and the bed permitting the upper plate to rock and to move longitudinally relatively to the bed.

20. In a vehicle the combination of an axle, a bed, two pneumatic cushions, a lower support for each pneumatic cushion carried by the axle, an upper support for each cushion connected to the bed, connections between the axle and each upper support permitting it, independently of the other upper support of the other cushion, to move vertically in reference to the axle, but causing it to move longitudinally and to rock with the axle, and means connected with such connections for causing such vertical play to be cushioned.

21. In a vehicle the combination of an axle, a bed, a pneumatic cushion, two supports for the same, one carried by the axle, and the other fixedly secured to the bed, and connections between the axle and the support secured to the bed permitting the axle to move vertically and longitudinally, and to rock on its axis, independently of the bed.

22. In a vehicle the combination of an axle, a bed, a pneumatic cushion, two supports for the pneumatic cushion, one rigidly carried by the axle and the other rigidly secured to the bed in every way except vertically, and connections between the axle and the support secured to the bed, permitting the axle to move longitudinally and to rock on its axis independently of the bed.

In testimony whereof, I have signed my name to this specification, in the presence of two subscribing witnesses.

THEODORE A. KLENKE.

Witnesses:
EDWIN SEGER,
T. E. RAFTERY.